(12) United States Patent
Puchtler

(10) Patent No.: US 9,714,734 B2
(45) Date of Patent: Jul. 25, 2017

(54) EXPANSION JOINT SPRING CLIP

(71) Applicant: FRENZELIT WERKE GMBH, Frankenhammer (DE)

(72) Inventor: Stefan Puchtler, Munchberg (DE)

(73) Assignee: Frenzelit Werke GmbH, Frankenhammer (DE)

( * ) Notice: Subject to any disclaimer, the term of this patent is extended or adjusted under 35 U.S.C. 154(b) by 252 days.

(21) Appl. No.: 14/013,008

(22) Filed: Aug. 28, 2013

(65) Prior Publication Data

US 2015/0061284 A1 Mar. 5, 2015

(51) Int. Cl.
*F16L 51/02* (2006.01)
*F16L 27/108* (2006.01)
*F16L 27/107* (2006.01)
*F23J 13/04* (2006.01)
*F16L 51/00* (2006.01)

(52) U.S. Cl.
CPC .......... *F16L 51/022* (2013.01); *F16L 27/107* (2013.01); *F16L 27/108* (2013.01); *F16L 51/021* (2013.01); *F16L 51/00* (2013.01); *F23J 13/04* (2013.01); *F23J 2213/202* (2013.01); *F23J 2213/204* (2013.01); *Y10T 29/49428* (2015.01)

(58) Field of Classification Search
CPC ......... F16L 51/00; F16L 51/02; F16L 51/026; F16L 51/027; F16L 51/024; F16L 51/021; F16L 27/107; F16L 51/022; F16L 27/108; F23J 13/04; F23J 2213/202; F23J 2213/204; Y10T 29/49428

USPC ................. 285/229, 223, 226, 424
See application file for complete search history.

(56) References Cited

U.S. PATENT DOCUMENTS

| | | | | |
|---|---|---|---|---|
| 3,347,726 A | * | 10/1967 | Wilkinson | 156/190 |
| 3,460,856 A | * | 8/1969 | Van Tine et al. | 285/53 |
| 4,090,726 A | * | 5/1978 | Mischel | F16L 51/024 285/229 |
| 4,140,338 A | * | 2/1979 | Kazmierski et al. | 285/229 |
| 6,402,203 B1 | * | 6/2002 | Mathiesen et al. | 285/299 |

FOREIGN PATENT DOCUMENTS

EP 445544 A2 * 9/1991 ............ F16L 27/107

* cited by examiner

*Primary Examiner* — Gregory Binda
*Assistant Examiner* — Zachary Dragicevich
(74) *Attorney, Agent, or Firm* — Fishman & Associates, LLC.

(57) ABSTRACT

An expansion joint spring clip can eliminate flutter, pulsations and reverse bending on non-metallic fabric flue duct expansion joints. The expansion joint spring clip can hold the expansion joint in a fixed arch such that it can still perform its function with regard to accommodating the ducting system movements. The expansion joint spring clip allows the entire width of the non-metallic expansion joint to retain its position during start-ups, downloading and during full or partial boiler, kiln, furnace loads and the like. The expansion joint spring clip can be installed in the existing geometry of an expansion joint by producing an arch while not damaging the expansion joint after being installed. The expansion joint can still accommodate axial and limited lateral movements, allowing the expansion joint to perform its function.

6 Claims, 3 Drawing Sheets

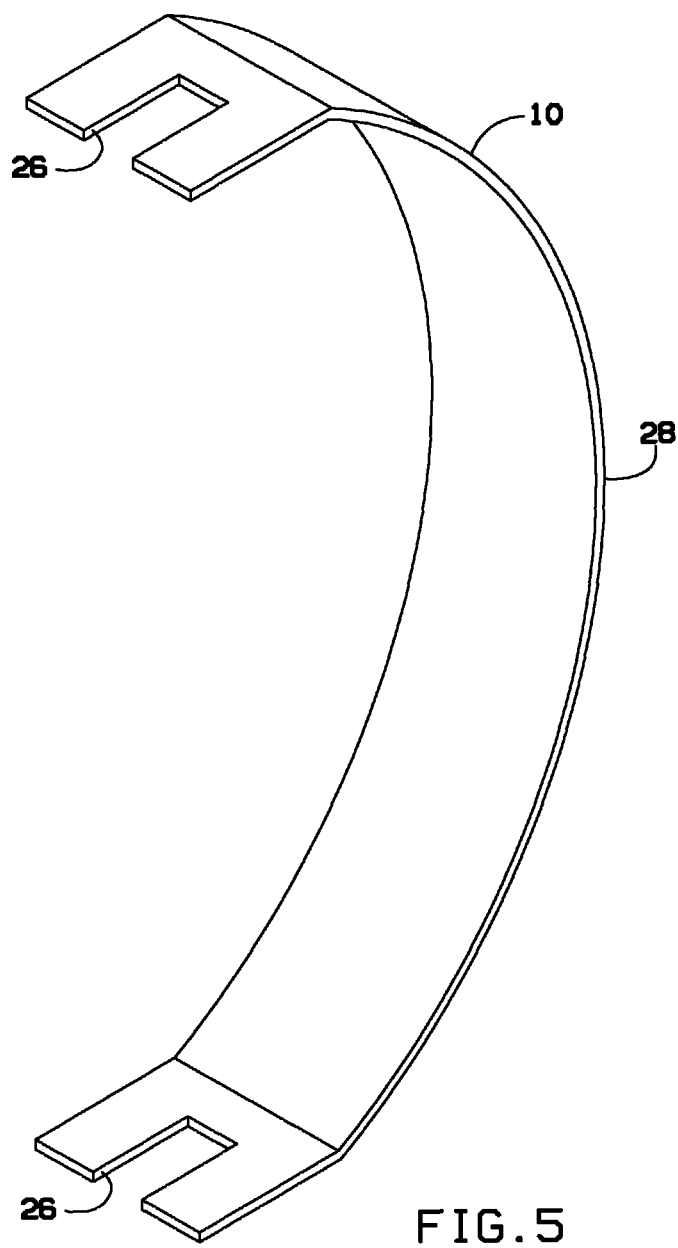

EXPANSION JOINT SPRING CLIP

BACKGROUND OF THE INVENTION

The present invention relates to expansion joint construction and, more particularly, to an expansion joint spring clip that is designed as a metallic band that can eliminate flutter, pulsations and reverse bending on non-metallic fabric flue duct expansion joints.

An expansion joint is an assembly designed to safely absorb the heat-induced expansion and contraction of construction materials, to absorb vibration, to hold parts together, or to allow movement due to ground settlement or earthquakes.

Expansion joints are required in large ducted air systems to allow fixed pieces of piping to be largely free of stress as thermal expansion occurs. Expansion joints also isolate pieces of equipment, such as fans, from the rigid ductwork, thereby reducing vibration to the ductwork as well as allowing the fan to grow as it comes up to the operating air system temperature without putting stress on the fan or the fixed portions of ductwork.

There are certain conditions in flue gas and other ducting systems that require expansion joints for the relief of thermal and other movements. These systems utilize single or multiple fans to pressurize and convey the medium through the ducting system. This often introduces small amplitude, high frequency movements, known as vibrations, or somewhat higher amplitude movements, known as flutter, or very large amplitude movements as a result of pressure fluctuations, causing a reverse bending in the flexible element of the expansion joint.

These movements can lead to a separation of the layers of the expansion joint and ultimately to total failure.

Currently, devices known as flutter belts can be used to help protect an expansion joint. However, flutter belts have a lack of rigidity and only partially protect part of the entire expansion joint's width.

As can be seen, there is a need for a device that can hold an expansion joint in a fixed arch such that it can perform its function with regard to accommodating the ducting system movements, while eliminating vibrations, flutter and reverse bending.

SUMMARY OF THE INVENTION

In one aspect of the present invention, an expansion joint comprises first and second side bars on each side of the expansion joint; a fabric disposed between the side bars; a plurality of spring plates disposed between the side bars; and a spring plate arch on each of the plurality of spring plates, the spring plate arch curving continuously from the first side bar to the second side bar, curving toward the fabric.

In another aspect of the present invention, an expansion joint comprises first and second side bars on each side of the expansion joint; a fabric disposed between the side bars; a plurality of spring plates disposed between the side bars; a notch in each end of the plurality of spring plates wherein the notch fits about a bolt disposed in the first and second side bars; a spring plate arch on each of the plurality of spring plates, the spring plate arch curving continuously from the first side bar to the second side bar, curving toward the fabric; and a flexible material disposed between the plurality of spring plates and the fabric.

In a further aspect of the present invention, a method for eliminating flutter, pulsations and reverse bending on non-metallic fabric flue duct expansion joints comprises disposing spring plates across non-metallic fabric of the expansion joint; arching the spring plates continuously toward the non-metallic fabric; and retaining the non-metallic fabric in an arched configuration during use of the flue duct, wherein the spring plates prevent reverse bending of the non-metallic fabric.

These and other features, aspects and advantages of the present invention will become better understood with reference to the following drawings, description and claims.

BRIEF DESCRIPTION OF THE DRAWINGS

FIG. 5 is a perspective view of a spring plate of the expansion joint metallic band of FIG. 1.

DETAILED DESCRIPTION OF THE INVENTION

Figure 1:
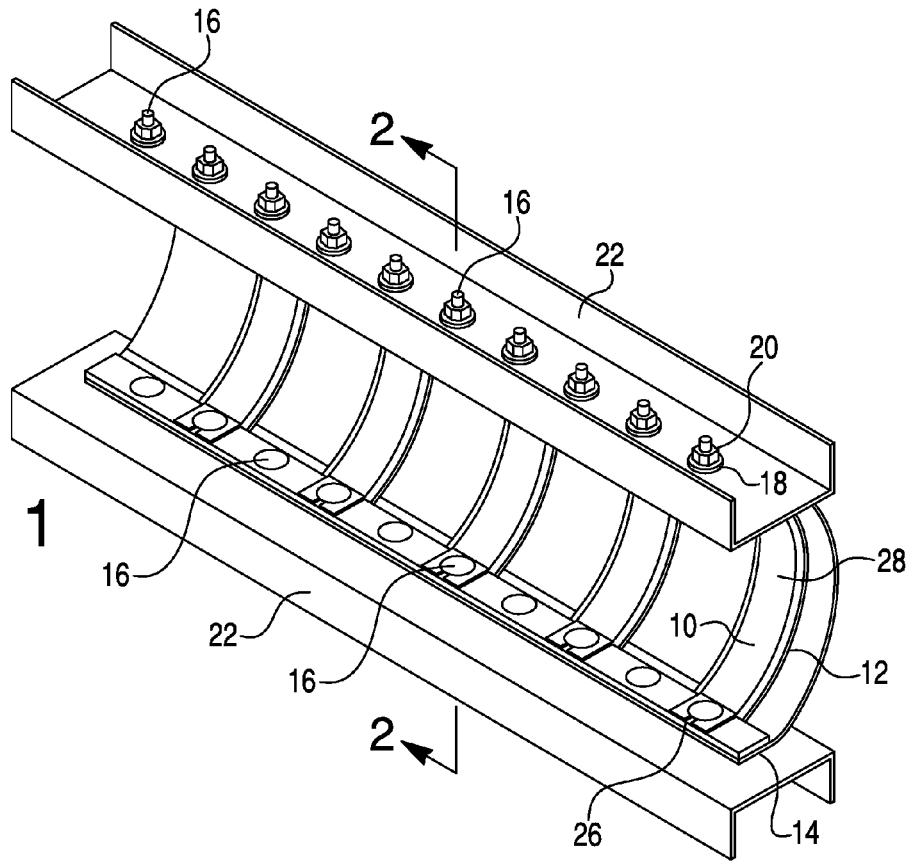
FIG. 1 is a perspective view of an expansion joint metallic band, shown in use on an expansion joint, according to an exemplary embodiment of the present invention.
Figure 2:
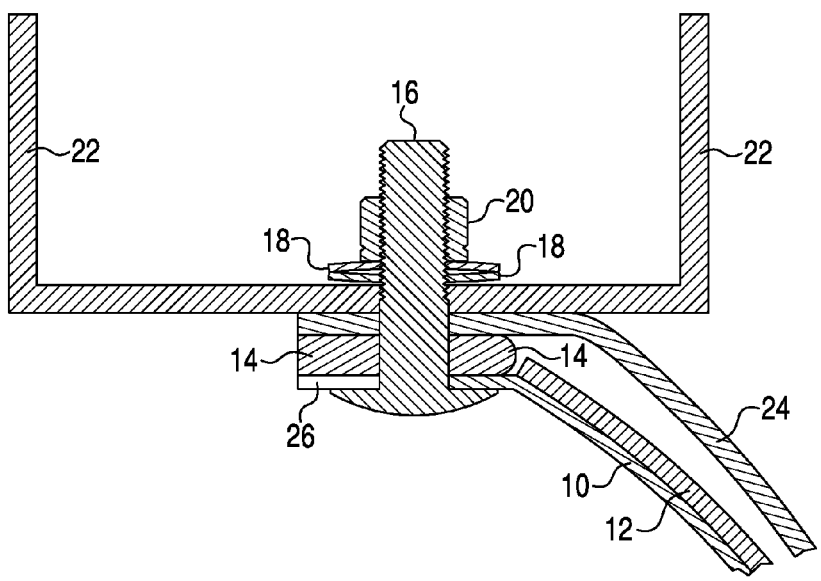
FIG. 2 is a cross-sectional view taken along line 2-2 of FIG. 1.
Figure 3:
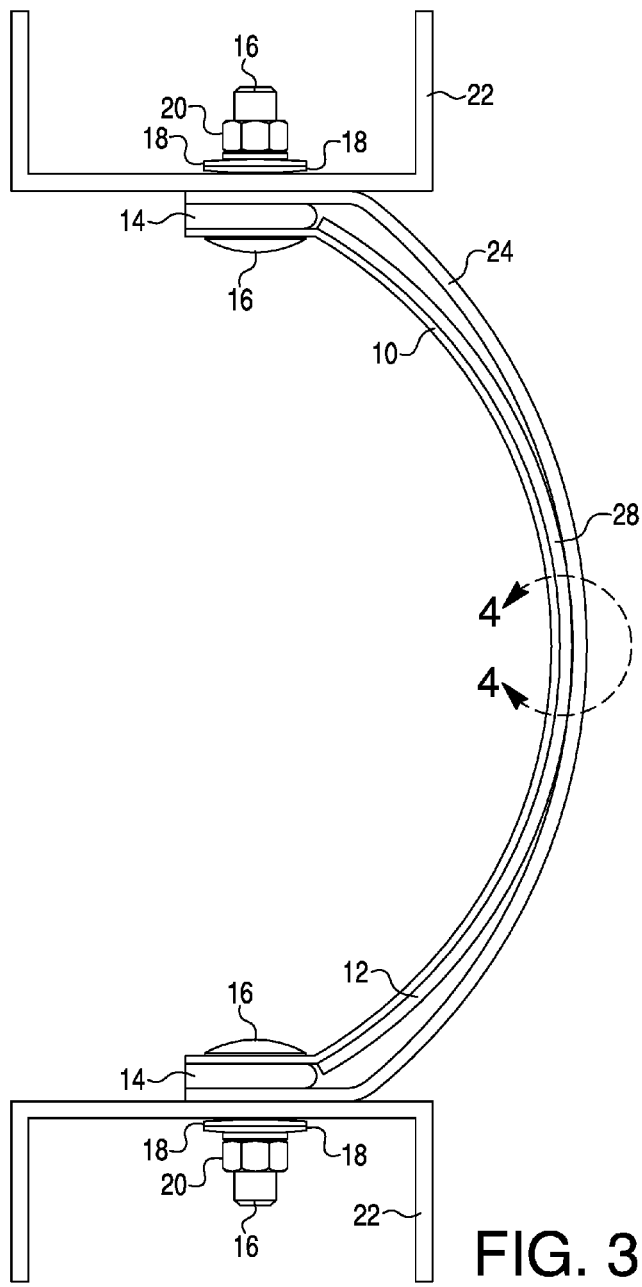
FIG. 3 is a side view of the expansion joint metallic band and expansion joint of FIG. 1.
Figure 4:
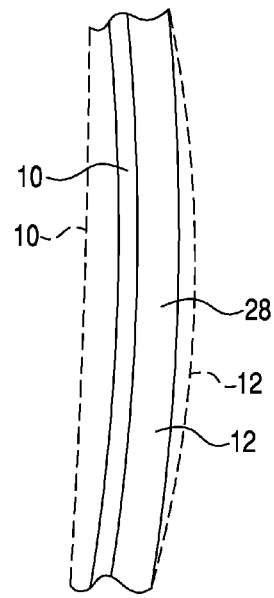
FIG. 4 is a detailed side view taken along portion 4-4 of FIG. 3.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an expansion joint spring clip that can eliminate flutter, pulsations and reverse bending on non-metallic fabric flue duct expansion joints. The expansion joint spring clip can hold the expansion joint in a fixed arch such that it can still perform its function with regard to accommodating the ducting system movements. The expansion joint spring clip allows the entire width of the non-metallic expansion joint to retain its position during start-ups, downloading and during full or partial boiler, kiln, furnace loads and the like. The expansion joint spring clip can be installed in the existing geometry of an expansion joint by producing an arch while not damaging the expansion joint after being installed. The expansion joint can still accommodate axial and limited lateral movements, allowing the expansion joint to perform its function.

Referring now to FIGS. 1 through 5, an expansion joint can include a pair of spaced apart side bars 22 having a non-metallic fabric 24 therebetween. A plurality of spring plates 10 can be disposed between the pair of side bars 22. The spring plates 10 can be bolted in place on the outside of the duct (not shown) with a spring plate arch 28 directed outward toward the non-metallic fabric 24.

A narrow piece of flexible material 12, such as a fluoroelastomer material, can be adhered to each of the spring plates 10 to separate the non-metallic fabric 24 of the expansion joint from the spring plates 10, thereby protecting the non-metallic fabric 24 from the edges of the spring plates 10. In some embodiments, a continuous strip of flexible material 12 can span the entire length of the non-metallic fabric 24, thereby protecting the expansion joint from all of the spring plates 10. In some embodiments, the spring plates 10 can be fabricated with rounded edges to further help prevent damage to the non-metallic fabric 24 during operation.

The spring plates 10 can be fabricated from various materials, such as a metal, typically a light gauge metal, that can provide joint flex while preventing reverse bending of the non-metallic fabric 24. The spring plates 10 can be made from, for example, stainless steel.

The spring plates 10 can be cut with a slot 26 in each end for feeding the slotted ends about a bolt 16 attached to the side bars 22. A nut 20 and washers 18 can be used to keep the bolt 16 in place and secure the spring plates 10 thereto. A backup bar 14 can be disposed along the side bars 22, secured in place with each of the bolts 16.

The spring plates 10 can be made to the exact widths and lengths as dictated by the geometry for each application. The exact gauge, width, length and bend angle can be adjusted to provide proper performance based on breach opening, operating pressure, anticipated movements of the expansion joint, and the like.

When installed, as shown in FIG. 1, the spring plates 10 hold the expansion joint (and its non-metallic fabric 24) in an arch configuration. The size and number of spring plates 10 required can be dependent on the internal pressures and shape of the arch. While in the installed configuration of FIG. 1, the expansion joint is free to move in an axial direction as was intended by the expansion joint alone (without the spring plates), while maintaining the arch configuration against pressure, thus eliminating the tendency to vibrate, flutter or bend in the reverse direction.

In some embodiments, the spring plates of the present invention can be installed on an existing expansion joint. In other embodiments, the spring plates can be formed with a new expansion joint to be installed in a duct.

It should be understood, of course, that the foregoing relates to exemplary embodiments of the invention and that modifications may be made without departing from the spirit and scope of the invention as set forth in the following claims.

What is claimed is:

1. An expansion joint support consisting essentially of:
 1) a plurality of spring metal plates spaced apart and located between a first side bar and a second side bar, wherein each said spring metal plate has a first end and a second end, said first end is coupled to said first side bar and said second end is coupled to said second side bar, and said spring metal plate has a curvature extending from said first end to said second end;
 2) a single overlay of a flexible fluoroelastomer material located on a convex side of said curved spring metal plate, and between said first and said second sidebars.

2. The expansion joint support of claim 1, wherein each of said first and said second end of each spring metal plate contains a notch or slot.

3. The expansion joint support of claim 2, wherein said notch or slot fits about a bolt located on said first and said second sidebar.

4. The expansion joint of claim 1, wherein said flexible fluoroelastomer material is a single sheet of overlay extending across said plurality of spring metal plates and in between said first and said second sidebars.

5. A method for eliminating flutter, pulsations and reverse bending of a non-metallic fabric flue duct expansion joint, consisting essentially of:
 1) disposing a plurality of spring metal plates spaced apart and across said non-metallic fabric of said expansion joint, wherein said plurality of spring metal plates and said fabric located in between a first sidebar and a second sidebar, and each of said spring plate has a first end and a second end, and said spring metal plate has a curvature extending from said first end to said second end, wherein said spring metal plate is secured between said first and said second sidebar by fitting a notch or slot on each of said first and said second end of said spring metal plate, about a bolt disposed in said first and said second sidebars;
 2) disposing a single overlay of a flexible fluoroelastomer material onto a convex said of said curved spring metal plate, wherein said flexible fluoroelastomer abuts and retains said fabric in an arch configuration at the apex of said curvature of said spring metal plate.

6. An expansion joint consisting essentially of:
 1) an expansion joint support of claim 1; and
 2) an expansion joint fabric having a first end and a second end, wherein said fabric is disposed between said first sidebar and said second sidebar, wherein said flexible fluoroelastomer material abuts and supports said expansion joint fabric at an apex of said curvature of said metal spring plate, wherein a first backup bar is fitted between said first fabric end and said first spring metal plate end, such that a first bolt fits through said first backup bar and couples said first fabric end and said first spring metal plate end together on said first sidebar, and a second backup bar fitted between said second fabric end and said second spring metal plate end, such that a second bolt fits through said second backup bar and couples said second fabric end and said second spring metal plate end together on said second sidebar.

* * * * *